United States Patent Office 3,444,089
Patented May 13, 1969

3,444,089
EXCIMER SCINTILLATORS
James G. Carter and Loukas G. Christophorou, Oak Ridge, Tenn., assignors to the United States of America as represented by the United States Atomic Energy Commission
Filed July 18, 1966, Ser. No. 566,090
Int. Cl. C09k *1/02;* G01n *31/00*
U.S. Cl. 252—301.2                                    16 Claims

ABSTRACT OF THE DISCLOSURE

Liquid scintillators are formulated with a solvent which forms excimers. Two such solvents are 1,6-dimethylnaphthalene and 2-ethylnaphthalene, for example. Use of such solvents in liquid scintillators enhances energy transfer from solvent to solute, minimizes the quenching effect caused by quenching materials in the scintillators, and permits detection of weaker radiation while at the same time permitting the use of smaller volumes of the scintillators and providing for a substantial improvement in detection efficiency.

---

The invention described herein was made in the course of, or under, a contract with the U.S. Atomic Energy Commission.

Liquid scintillators are used extensively in the measurement of ionizing particles because of several factors, including: availability of any size or configuration, freedom of location of the photomultiplier, and freedom of location of the source of ionizing medium. Conventional liquid scintillators comprise at least a solvent, M, for interacting with the impinging radiation, $h\nu_i$, and a solute, S (at small concentrations), to which the energy is transferred mainly from the solvent so as to produce detectable (i.e., visible) radiation, $h\nu_o$. This process may be described by the following reactions:

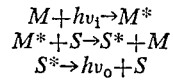

where * denotes electronic excitation. The efficiency of this energy transfer is rather low, resulting in bulky liquid scintillators. In addition, many liquid scintillator compositions (referred to as loaded scintillators) include quenching materials, Q, e.g., heavy metals, water, chloroform, which reduce the light output by quenching the excitation energy of M* according to the reaction:

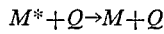

Thus, there exists a need for a more efficient liquid scintillator wherein the effects of quenching materials can be minimized, thus improving the energy transfer in such a scintillator and resulting in a smaller size device for a given, desired light output therefrom, or for a given size of the scintillator, resulting in a substantial improvement in the light output therefrom.

With a knowledge of the limitations of prior liquid scintillators, as discussed above, it is the object of the present invention to provide an improved liquid scintillator with certain materials therein which will minimize the effects of the quenching materials present in the scintillator mixture, thus to improve the efficiency thereof in detection of radiation.

This and other objects and advantages of the present invention will become apparent upon a consideration of the following detailed specification and the accompanying drawings, wherein.

The above object has been accomplished in the present invention by providing liquid scintillators which are formulated with a solvent which forms excimers. It has been discovered that use of such excimer-forming solvents in liquid scintillators enhances energy transfer from solvent to solute, and results in substantially less quenching of the excited solvent molecules by the quenching materials present in the scintillator composition. Thus, the scintillators of the present invention, to be described hereinafter, yield a greater light output for a given input than conventional scintillators which are or are not loaded. Accordingly, weaker radiation can be detected and smaller volumes of the scintillator are required. Neutrons, X-rays, and $\gamma$-rays, for example, may be detected by appropriate scintillators of the present invention for use in many fields, especially high energy physics and biological studies.

The present invention will be described for some of the solvents that form excimers in the liquid state and at room temperature. It should be understood that excimer-forming solvents other than those described hereinafter can be used, if desired, and that solvents that form excimers at temperatures other than at room temperature can also be utilized, if desired.

Two of the excimer-forming solvents that are utilized in the present invention are 1,6-dimethylnaphthalene and 2-ethylnaphthalene (2-EN), for example. The 2-EN solvent is preferred for use in the scintillator of the present invention because of the better detection efficiency effected by this solvent therein as compared to the use of the other excimer-forming solvent mentioned hereinabove, as will be evident by the discussion of the operating results effected by the use of both these solvents in scintillators as set forth hereinafter.

Some of the quenchers that have been utilized in the scintillator compositions of the present invention are: di-n-butyl mercury (DBM), thiophene, tri-n-butyl phosphate, and triphenyl bismuthine, for example.

Some of the solutes that have been utilized in the scintillator compositions of the present invention are: 2,5-diphenyloxazole (PPO), 9,10 - diphenylanthracene (DPA), and 2 - (1 - naphthyl) - 5 - phenyloxazole (αNPO), for example.

The photofluorescence and scintillation emission of liquid 2-ethylnaphthalene (2-EN) is almost completely excimeric at room temperature, while at higher temperatures the monomer emission is enhanced and that of the excimer decreased due to the excimer dissociation. The solvent 2-EN also meets most of the requirements for a good scintillator solvent; its density is high (16% higher than that of toluene), its volatility and flammability are low, its electron density is 15% higher than that of toluene, while most of the efficient scintillator solutes and a number of scintillator loading materials are dissolved in 2-EN at room temperature.

Figure 1:
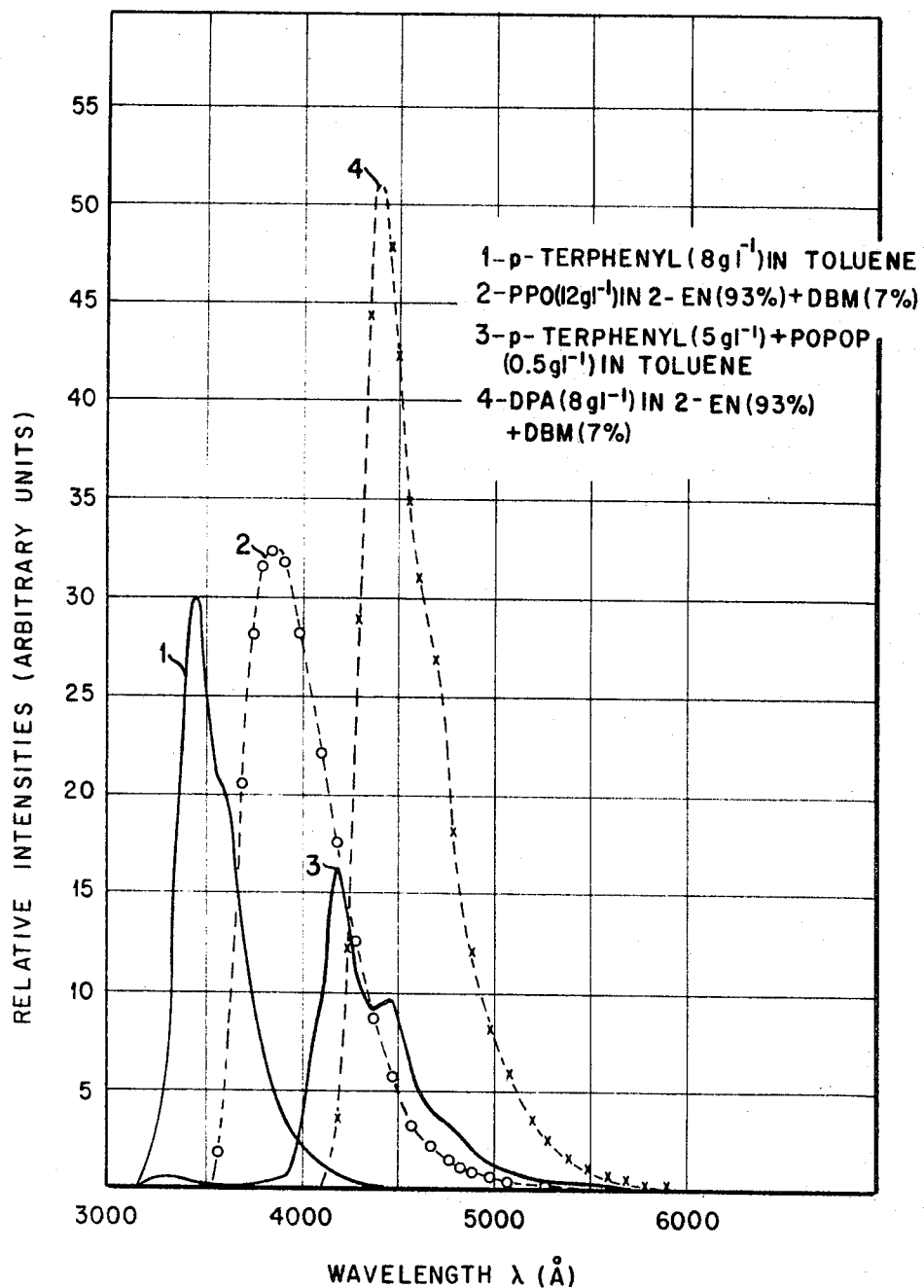
FIG. 1 is a graph illustrating the emission intensities of two prior art liquid scintillators as compared with two of the present invention.

In one scintillator solution of the present invention, 2-EN was incorporated with di-n-butyl mercury (DBM) and 2,5-diphenyloxazole (PPO). The DBM, because of the heavy metal, normally produces a quenching action in conventional scintillator solutions. However, due to the action of the excimer in the present invention, there is a concentration of the quencher DBM at which the integrated emission intensity, $I_{int}$, is greatly increased to some maximum. With PPO of 4.5 g./l., this maximum occurs at 93% 2-EN and 7% DBM. A scintillator of this composition demonstrated an integrated emission intensity 1.65 times that of a conventional scintillator solution comprising 5 g./l. p-terphenyl+0.5 g./l. POPOP [2,2'-phenylene-bis-(5-phenyloxazole)] in toluene, using 230 Kev. X-rays to excite the solutions and observing their emission intensities with a Bausch and Lomb 500 mm. grating monochromator and associated EMI 9558 QB photomultiplier. When the PPO concentration was increased from 4.5 to 12 g./l. in the above solution, while keeping the percentage of DBM in 2-EN constant (7%), the $I_{int}$ increased from the 1.65 value to 2.5 relative to the $I_{int}$ of the above conventional solution. Curves 2 and 3 of FIG. 1 illustrate this comparison. A scintillator having a composition of PPO (18 g./l.) in 2-EN (89.1%)+DBM (10.9%) gave similar results, that is, an $I_{int}$ 2.4 times that of the above conventional solution. Another scintillator having a composition of 5 g./l. αNPO in 2-EN (93%)+DBM (7%) also gave similar results, that is, an $I_{int}$ 2.09 times that of the above conventional scintillator.

Although another known scintillator (curve 1 of FIG. 1) comprising 8 g./l. p-terphenyl in toluene appears to have a comparable $I_{int}$, the output is detrimentally in the ultraviolet range. Furthermore, the poor reflectivity efficiency of the various materials in this wavelength region (e.g., aluminum) gives an over-all efficiency less than those of the scintillators of curves 2 and 3 of FIG. 1.

In another scintillator solution of the present invention, even more impressive results have been obtained using 9,10-diphenylanthracene (DPA) as the scintillator solute. With 8 g./l. DPA and 2-EN (93%)+DBM (7%), the $I_{int}$ is increased to a factor of 3.1 times the $I_{int}$ of the conventional standard. Curves 3 and 4 of FIG. 1 illustrate this comparison. Furthermore, the emission of the DPA has a maximum at 4400 A. which permits the use of the improved reflectivity of TiO as contrasted to aluminum and, in addition, the 4400 A. maximum in the emission corresponds to the maximum spectral response of the photomultipliers used in studies of this nature.

It should be understood that the concentration of the solute, DPA, in the above scintillator is not limited to 8 grams per liter, nor is the quencher material limited to DBM. The concentration of DPA may be varied from 8 g./l. to 14 g./l., for example, and the $I_{int}$ results are comparable to the results described above for the scintillator represented by curve 4 of FIG. 1. The following table shows the results of utilizing 12 g./l. DPA in 2-EN with various quencher materials.

| Quencher | Percent by mass (quencher) | Percent by mass (2-EN) | Percent of $I_{int}$ compared to standard (curve 3, FIG. 1) |
|---|---|---|---|
| Di-n-butyl mercury | 7 | 93 | 358 |
| Thiophene | 85 | 15 | 225 |
| Tri-n-butyl phosphate | 1 | 99 | 117 |
| Triphenyl bismuthine | 49 | 51 | 103 |

From the above table it can be seen that increasing the concentration of DPA from 8 g./l. to 12 g./l. for the scintillator in 2-EN (93%)+DBM (7%) increased the $I_{int}$ from about 310% to 358% compared to the $I_{int}$ for the standard scintillator. Also, using only 15% of 2-EN and 85% of the quencher thiophene the $I_{int}$ more than doubled that obtainable from the standard scintillator.

Figure 2:
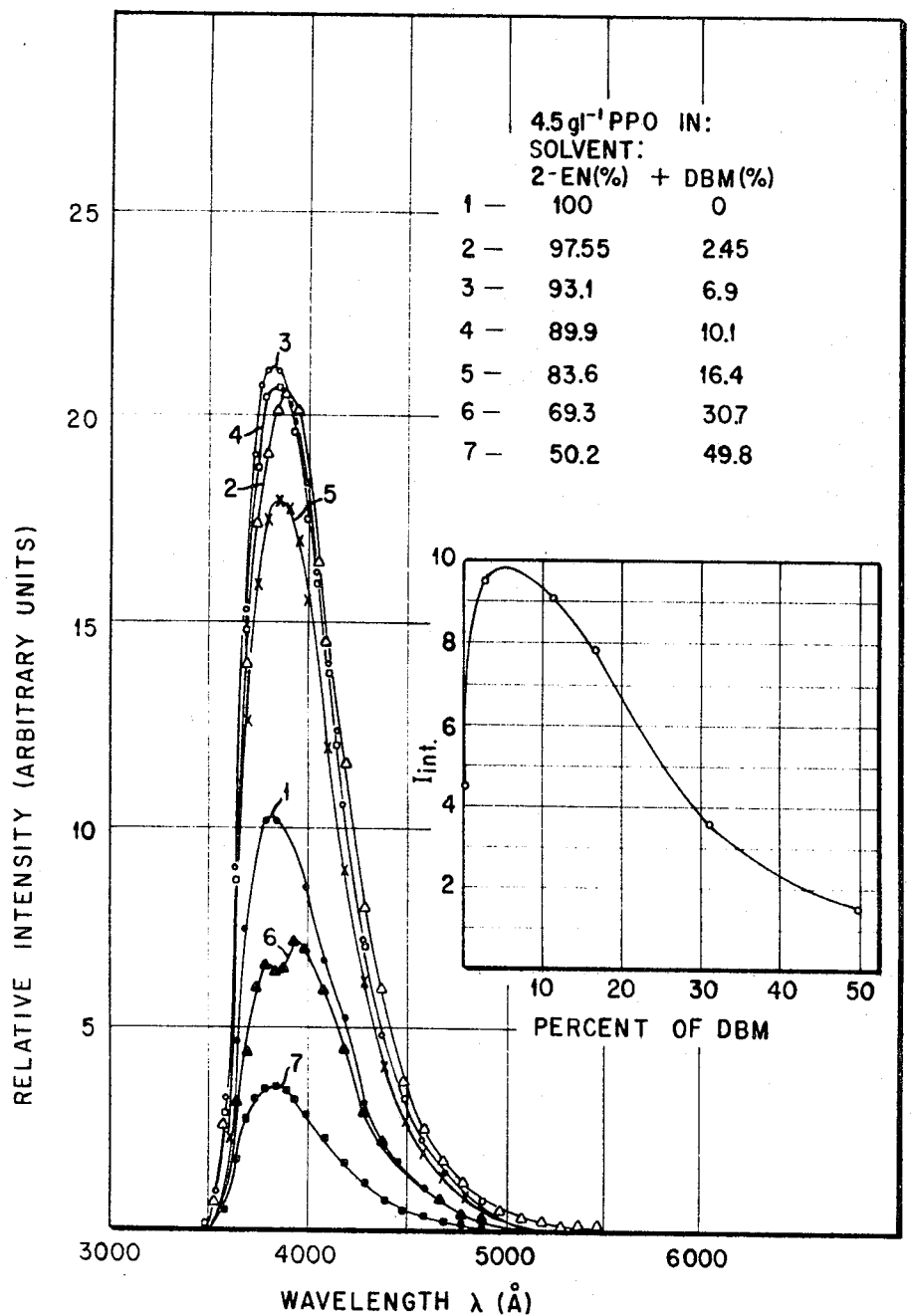
FIG. 2 is a graph showing the relative output intensity of a scintillator of the present invention as a function of the concentration of the "quencher" component.

As mentioned above, there is an optimum concentration of quencher component, DBM for example, in the scintillators of the present invention. This is illustrated in the curves of FIG. 2. In the insert is plotted the relative $I_{int}$ for a 4.5 g./l. PPO—2-EN scintillator to which is added varying amounts of quencher; namely, DBM. The curve in the insert, together with superimposed $I_{int}$-vs.-wavelength curves 1–7, demonstrates the beneficial effect of from 2.5 to about 10% DBM in the 2-EN. The maximum occurs at about 7% DBM.

Figure 3:
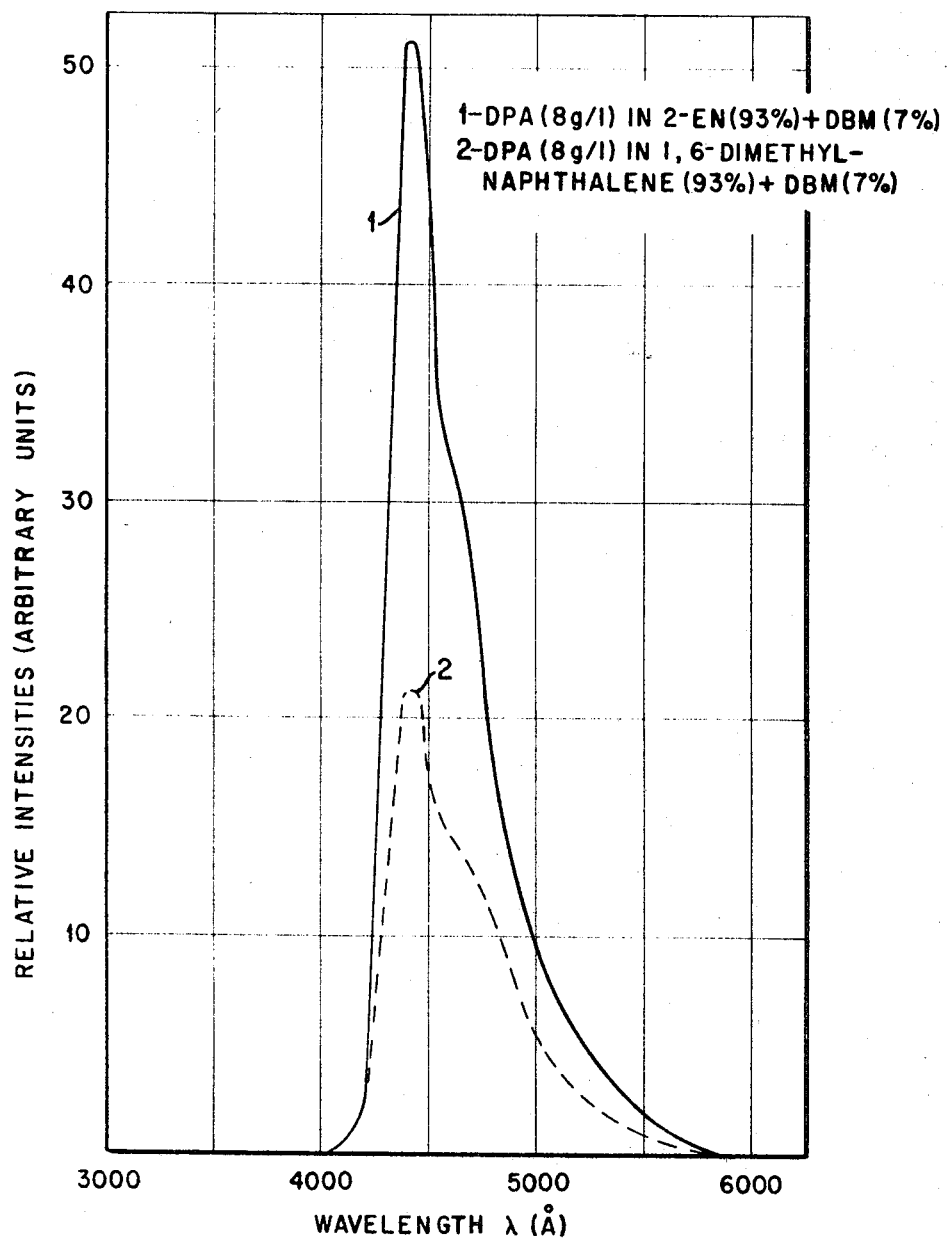
FIG. 3 is a graph comparing the relative intensity of two organic scintillators containing different excimer-forming solvents.

The excimer-forming solvent 1,6-dimethylnaphthalene, mentioned hereinabove, also provides for a more efficient scintillator when utilized in a scintillator composition. For example, 8 g./l. DPA in 1,6-dimethylnaphthalene (93%)+DBM (7%) provided an $I_{int}$ about 1.45 times that of the aforementioned conventional scintillator represented by curve 3 of FIG. 1. The curves of FIG. 3 show a comparison between the above 1,6-dimethylnaphthalene scintillator and a scintillator containing 8 g./l. DPA in 2-EN (93%)+DBM (7%). It should be self-evident that the scintillator containing 2-EN is much more effective than the one containing 1,6-dimethylnaphthalene; that is, the former provides an $I_{int}$ about 3.1 times that of the conventional scintillator of curve 3 of FIG. 1, while the latter provides an $I_{int}$ about 1.45 times that of the same conventional scintillator, as mentioned above. It should be noted that curve 4 of FIG. 1 and curve 1 of FIG. 3 represent the results of the same scintillator formulation.

The formation of the excimer in the excimer-forming solvents can be expressed as:

$$M^* + M \rightarrow MM^*$$

From the comparisons of the scintillators of the present invention with conventional scintillators, as described above, it should be apparent that energy transfer from the photoassociated excimer MM* to the solute molecule is more efficient than from the single excited molecule M* to the solute molecule. Energy exchange from the excimer to the solute can be expressed as:

$$MM^* + S \rightarrow S^* + M + M$$

Furthermore, the excimer may exchange energy with quencher materials, i.e., $$MM^* + Q \rightarrow Q^* + M + M$$

more efficiently than the quenching reaction:

$$MM^* + Q \rightarrow Q + M + M$$

The incident radiation also reacts with the quencher according to the expression:

$$Q + h\nu_i \rightarrow Q^*$$

The excited quencher molecule, Q*, however formed, then transfers energy to the solute, S, in the reaction:

$$Q^* + S \rightarrow S^* + Q$$

thus further increasing the output radiation from the scintillator containing the excimer-forming solvent for a given input radiation. Experiments have shown that $I_{int}$ of PPO in solvents such as xylene and toluene, where little or no excimer is formed at room temperature, decreases much faster with increasing concentrations of Q (e.g., chloroform) than in solvents where excimers dominate such as in the scintillators of the present invention.

Thus, it should be apparent from the comparisons described above that the use of excimers in scintillators to enhance energy transfer from solvent to solute, and to enable less quenching of the excited solvent molecules, to act, in a way, as a secondary solute shifting the M* emission to that of MM*, provides for more efficient liquid scintillators, "excimer scintillators," than heretofore possible with conventional scintillators. Accordingly, weaker radiation can be detected and smaller volumes of the present scintillator are required.

This invention has been described by way of illustration rather than by way of limitation and it should be apparent that it is equally applicable in fields other than those described.

What is claimed is:

1. An improved organic scintillator composition for the detection of radiation consisting of a solvent, a solute and a quencher, said solvent consisting of an excimer-forming solvent selected from the group consisting of 1,6-dimethylnaphthalene and 2-ethylnaphthalene, said solute selected from the group consisting of 2,5-diphenyloxazole, 9,10-diphenylanthracene, and 2-(1-naphthyl)-5-phenyloxazole, and said quencher selected from the group consisting of di-n-butyl mercury, chloroform, thiophene, tri-n-butyl phosphate, and triphenyl bismuthine.

2. The scintillator composition set forth in claim 1, wherein said selected excimer-forming solvent is 1,6-dimethylnaphthalene (93%), said selected solute is 9,10-diphenylanthrancene, and said selected quencher is di-n-butyl mercury (7%), said selected solute having a weighted value of 8 grams per liter dissolved in said solvent and quencher.

3. The scintillator composition set forth in claim 1, wherein said selected solute is 9,10-diphenylanthracene with a concentration of a selected value in the range from 8 grams per liter to 14 grams per liter, said selected excimer-forming solvent is 2-ethylnaphthalene, and said selected quencher is di-n-butyl mercury, said solute being dissolved in said solvent and quencher.

4. The scintillator composition set forth in claim 3, wherein said selected concentration of 9,10-diphenylanthracene is 8 grams per liter, said selected solvent constituting about 93% of said composition, and said selected quencher constituting about 7% of said composition.

5. The scintillator composition set forth in claim 3, wherein said selected concentration of 9,10-diphenylanthracene is 12 grams per liter, said selected solvent constituting about 93% of said composition, and said selected quencher constituting about 7% of said composition.

6. The scintillator composition set forth in claim 1, wherein said selected solute is 9,10-diphenylanthracene having a concentration of about 12 grams per liter in said composition, said selected excimer-forming solvent is 2-ethylnaphthalene (15%), and said selected quencher is thiophene (85%).

7. The scintillator composition set forth in claim 1, wherein said selected solute is 9,10-diphenylanthracene having a concentration of about 12 grams per liter in said composition, said selected excimer-forming solvent is 2-ethylnaphthalene (99%), and said selected quencher is tri-n-butyl phosphate (1%).

8. The scintillator composition set forth in claim 1, wherein said selected solute is 2-(1-naphthyl)-5-phenyloxazole having a concentration of about 5 grams per liter in said composition, said selected excimer-forming solvent is 2-ethylnaphthalene (93%), and said selected quencher is di-n-butyl mercury (7%).

9. The scintillator composition set forth in claim 1, wherein said selected solute is 2,5-diphenyloxazole of a selected concentration in the range from 4.5 grams per liter to 18 grams per liter, said selected excimer-forming solvent is 2-ethylnaphthalene, and said selected quencher is di-n-butyl mercury, said selected solvent constituting the major portion of said composition and having a selected value in the range from 83.6% to 97.55%, and said selected quencher constituting a minor portion of said composition and having a selected value in the range from 16.4% to 2.45%.

10. The scintillator composition set forth in claim 9, wherein the selected concentration of said selected solute is 4.5 grams per liter, said selected portion of said selected solvent being 93.1%, and said selected portion of said selected quencher being 6.9%.

11. The scintillator composition set forth in claim 9, wherein the selected concentration of said selected solute is 4.5 grams per liter, said selected portion of said selected solvent being 97.55%, and said selected portion of said selected quencher being 2.45%.

12. The scintillator composition set forth in claim 9, wherein the selected concentration of said selected solute is 4.5 grams per liter, said selected portion of said selected solvent being 89.9%, and said selected portion of said selected quencher being 10.1%.

13. The scintillator composition set forth in claim 9, wherein the selected concentration of said selected solute is 12 grams per liter, said selected portion of said selected solvent being 93.0%, and said selected portion of said selected quencher being 7%.

14. The scintillator composition set forth in claim 9, wherein the selected concentration of said selected solute is 18 grams per liter, said selected portion of said selected solvent is 89.1%, and said selected portion of said selected quencher is 10.9%.

15. The scintillator composition set forth in claim 9, wherein the selected concentration of said selected solute is 4.5 grams per liter, said selected portion of said selected solvent is 83.6%, and said selected portion of said selected quencher is 16.4%.

16. An improved organic scintillator composition for the detection of radiation consisting of an excimer-forming solvent; a solute selected from the group consisting of 2,5-diphenyloxazole, 9,10-diphenylanthracene, and 2-(1-naphthyl)-5-phenyloxazole; and a quencher selected from the group consisting of di-n-butyl mercury, thiophene, tri-n-butyl phosphate, triphenyl bismuthine, and chloroform, said solute being dissolved in said solvent and quencher.

References Cited

British Journal Applied Physics, vol. 15, pp. 399–404 (1964).

MAYER WEINBLATT, *Primary Examiner.*

U.S. Cl. X.R.

23—253; 250—71, 83; 252—408